United States Patent
Oestergaard et al.

(10) Patent No.: US 11,986,962 B2
(45) Date of Patent: *May 21, 2024

(54) METHOD FOR EXTENDING END USER PROGRAMMING OF AN INDUSTRIAL ROBOT WITH THIRD PARTY CONTRIBUTIONS

(71) Applicant: Universal Robots A/S, Odense (DK)

(72) Inventors: Esben H. Oestergaard, Odense (DK); Martin Slota, Odense (DK); Robert Wilterdink, Odense (DK)

(73) Assignee: UNIVERSAL ROBOTS A/S, Odense S (DK)

( * ) Notice: Subject to any disclaimer, the term of this patent is extended or adjusted under 35 U.S.C. 154(b) by 348 days.

This patent is subject to a terminal disclaimer.

(21) Appl. No.: 17/080,213

(22) Filed: Oct. 26, 2020

(65) Prior Publication Data
US 2021/0039254 A1 Feb. 11, 2021

Related U.S. Application Data

(63) Continuation of application No. 15/738,315, filed as application No. PCT/DK2016/050240 on Jul. 7, 2016, now Pat. No. 10,850,393.

(30) Foreign Application Priority Data

Jul. 8, 2015 (DK) .......................... PA 2015 70451

(51) Int. Cl.
B25J 9/16 (2006.01)
(52) U.S. Cl.
CPC ............. *B25J 9/1664* (2013.01); *B25J 9/161* (2013.01); *B25J 9/1656* (2013.01);
(Continued)

(58) Field of Classification Search
CPC ........ B25J 9/1664; B25J 9/161; B25J 9/1656; B25J 9/1697; G05B 2219/39548;
(Continued)

(56) References Cited

U.S. PATENT DOCUMENTS

| | | | |
|---|---|---|---|
| 4,166,543 A | 9/1979 | Dahlstrom | |
| 4,398,110 A | 8/1983 | Flinchbaugh et al. | |

(Continued)

FOREIGN PATENT DOCUMENTS

| | | | |
|---|---|---|---|
| CN | 101043980 A | 9/2007 | |
| CN | 101043980 A | 9/2007 | |

(Continued)

OTHER PUBLICATIONS

Second Office Action for Chinese Patent Application No. 201680040209.8. dated Feb. 19, 2021, with English Summary (7 Pages.).

(Continued)

*Primary Examiner* — Dalena Tran
(74) *Attorney, Agent, or Firm* — Burns & Levinson LLP

(57) ABSTRACT

There is provided a method for programming an industrial robot, where distributors and integrators can present accessories that run successfully at end users. Also the developer can define customized installation screens and program nodes for the end user. There is provided a software platform, where the developer can define customized installation screens and program nodes for the end user thereby extending an existing robot system with customized functionalities by still using the software platform available in the robot system. Hereby a robot developer can define customized installation screens and program nodes for the end user. These can, for example, encapsulate complex new robot programming concepts, or provide friendly hardware configuration interfaces.

28 Claims, 1 Drawing Sheet

(52) U.S. Cl.
CPC ............. *G05B 2219/39548* (2013.01); *G05B 2219/40099* (2013.01); *Y10S 901/03* (2013.01)

(58) Field of Classification Search
CPC ......... G05B 2219/40099; Y10S 901/03; Y10S 901/01; Y10S 901/46; G05D 1/0088
USPC ............. 700/245, 250, 257, 264; 901/1, 3, 8
See application file for complete search history.

(56) References Cited

U.S. PATENT DOCUMENTS

| | | | |
|---|---|---|---|
| 4,678,952 | A | 7/1987 | Peterson et al. |
| 4,744,039 | A | 5/1988 | Suzuki et al. |
| 4,753,569 | A | 6/1988 | Pryor |
| 4,817,017 | A | 3/1989 | Kato |
| 5,103,941 | A | 4/1992 | Vranish |
| 5,155,423 | A | 10/1992 | Karlen et al. |
| 5,220,261 | A | 6/1993 | Kempas |
| 5,293,107 | A | 3/1994 | Akeel |
| 5,341,289 | A | 8/1994 | Lee |
| 5,353,386 | A | 10/1994 | Kasagami et al. |
| 5,495,410 | A | 2/1996 | Graf |
| 5,880,956 | A | 3/1999 | Graf |
| 6,040,109 | A | 3/2000 | Coppens et al. |
| 6,041,274 | A | 3/2000 | Onishi et al. |
| 6,070,109 | A | 5/2000 | McGee et al. |
| 6,131,296 | A | 10/2000 | Fager |
| 6,292,715 | B1 | 9/2001 | Rongo |
| 6,408,224 | B1 | 6/2002 | Okamoto et al. |
| 6,519,860 | B1 | 2/2003 | Bieg et al. |
| 6,535,794 | B1 | 3/2003 | Raab |
| 6,704,619 | B1 | 3/2004 | Coleman et al. |
| 6,822,412 | B1 | 11/2004 | Gan et al. |
| 6,837,892 | B2 | 1/2005 | Shoham |
| 6,847,922 | B1 | 1/2005 | Wampler, II |
| 6,856,863 | B1 | 2/2005 | Sundar |
| 6,922,610 | B2 | 7/2005 | Okamoto et al. |
| 6,944,584 | B1* | 9/2005 | Tenney .............. G05B 19/0426 703/22 |
| 6,996,456 | B2 | 2/2006 | Cordell et al. |
| 7,248,012 | B2 | 7/2007 | Takahashi et al. |
| 7,272,524 | B2 | 9/2007 | Brogardh |
| 7,278,222 | B2 | 10/2007 | Maier et al. |
| 7,298,385 | B2 | 11/2007 | Kazi et al. |
| 7,300,240 | B2 | 11/2007 | Brogardh |
| 7,571,025 | B2 | 8/2009 | Bischoff |
| 7,643,907 | B2 | 1/2010 | Fuhlbrigge et al. |
| 7,756,608 | B2 | 7/2010 | Brogardh |
| 7,917,863 | B2 | 3/2011 | Chandhoke et al. |
| 8,002,716 | B2 | 8/2011 | Jacobsen et al. |
| 8,050,797 | B2 | 11/2011 | Lapham |
| 8,160,205 | B2 | 4/2012 | Saracen et al. |
| 8,255,462 | B2 | 8/2012 | Kondo |
| 8,301,421 | B2 | 10/2012 | Bacon |
| 8,307,061 | B1* | 11/2012 | Hickman .............. H04L 67/10 709/200 |
| 8,340,820 | B2 | 12/2012 | Nair |
| 8,410,732 | B2 | 4/2013 | Kassow et al. |
| 8,457,786 | B2 | 6/2013 | Andersson |
| 8,571,706 | B2 | 10/2013 | Zhang et al. |
| 8,571,711 | B2 | 10/2013 | Jacobsen |
| 8,614,559 | B2 | 12/2013 | Kassow et al. |
| 8,756,973 | B2 | 6/2014 | Wallace et al. |
| 8,774,965 | B2 | 7/2014 | Weiss et al. |
| 8,779,715 | B2 | 7/2014 | Kassow et al. |
| 8,812,155 | B2 | 8/2014 | Brethe |
| 9,248,573 | B2 | 2/2016 | SøE-knudsen et al. |
| 9,833,897 | B2 | 12/2017 | SøE-knudsen et al. |
| 10,399,232 | B2 | 9/2019 | Oestergaard et al. |
| D895,704 | S | 9/2020 | Johansen |
| D895,705 | S | 9/2020 | Johansen |
| D895,706 | S | 9/2020 | Johansen |
| D898,090 | S | 10/2020 | Johansen |
| 10,850,393 | B2 | 12/2020 | Oestergaard et al. |
| D915,487 | S | 4/2021 | Sell |
| D924,228 | S | 7/2021 | Mirth |
| D932,485 | S | 10/2021 | Mirth |
| D932,486 | S | 10/2021 | Mirth |
| D932,487 | S | 10/2021 | Mirth |
| 2002/0013675 | A1 | 1/2002 | Knoll et al. |
| 2002/0191023 | A1* | 12/2002 | Chandhoke ........ G05B 19/0426 715/771 |
| 2003/0120391 | A1 | 6/2003 | Saito |
| 2004/0078114 | A1 | 4/2004 | Cordell et al. |
| 2004/0172164 | A1 | 9/2004 | Habibi et al. |
| 2004/0189631 | A1 | 9/2004 | Kazi et al. |
| 2004/0212626 | A1 | 10/2004 | Lyxzen et al. |
| 2005/0080515 | A1 | 4/2005 | Watanabe et al. |
| 2005/0267637 | A1 | 12/2005 | Lapham |
| 2005/0273198 | A1 | 12/2005 | Bischoff |
| 2006/0069466 | A1 | 3/2006 | Kato et al. |
| 2006/0125806 | A1 | 6/2006 | Voyles et al. |
| 2006/0163939 | A1 | 7/2006 | Kuramochi et al. |
| 2006/0178775 | A1 | 8/2006 | Zhang et al. |
| 2006/0178778 | A1 | 8/2006 | Fuhlbrigge et al. |
| 2007/0150102 | A1 | 6/2007 | Park et al. |
| 2008/0004632 | A1 | 1/2008 | Sutherland et al. |
| 2008/0140258 | A1 | 6/2008 | Ueno et al. |
| 2008/0141220 | A1 | 6/2008 | Kim et al. |
| 2008/0188983 | A1 | 8/2008 | Ban et al. |
| 2008/0188986 | A1 | 8/2008 | Hoppe |
| 2008/0319557 | A1 | 12/2008 | Summers et al. |
| 2009/0076655 | A1 | 3/2009 | Blondel et al. |
| 2009/0157226 | A1 | 6/2009 | de Smet |
| 2009/0259337 | A1 | 10/2009 | Harrold et al. |
| 2009/0269591 | A1 | 10/2009 | Kasianova et al. |
| 2009/0289591 | A1 | 11/2009 | Kassow et al. |
| 2010/0241270 | A1 | 9/2010 | Eliuk et al. |
| 2011/0022216 | A1 | 1/2011 | Andersson |
| 2012/0110489 | A1* | 5/2012 | Huttelmaier .......... G06F 3/0481 715/771 |
| 2012/0210817 | A1 | 8/2012 | Kassow et al. |
| 2013/0079928 | A1 | 3/2013 | Søe-knudsen et al. |
| 2013/0231778 | A1 | 9/2013 | Østergaard |
| 2013/0255426 | A1 | 10/2013 | Kassow et al. |
| 2014/0277737 | A1* | 9/2014 | Sekiyama .............. B25J 9/1671 700/259 |
| 2014/0277743 | A1 | 9/2014 | Hart et al. |
| 2015/0217445 | A1* | 8/2015 | Hietmann .............. B25J 9/1656 901/4 |
| 2015/0336268 | A1* | 11/2015 | Payton ................. G05B 19/423 901/3 |
| 2016/0052128 | A1* | 2/2016 | Zimmermann ........ B25J 9/1633 901/4 |
| 2016/0136805 | A1 | 5/2016 | Søe-knudsen et al. |
| 2016/0350101 | A1 | 12/2016 | Gelfenbeyn et al. |
| 2017/0057095 | A1 | 3/2017 | Oestergaard et al. |
| 2018/0178380 | A1 | 6/2018 | Oestergaard et al. |
| 2019/0086907 | A1 | 3/2019 | Oestergaard et al. |
| 2020/0171658 | A1 | 6/2020 | Kielsholm Thomsen |
| 2020/0034056 | A1 | 10/2020 | Henrik |
| 2020/0039139 | A1 | 12/2020 | Steffen |
| 2021/0039254 | A1 | 2/2021 | Oestergaard et al. |
| 2021/0086374 | A1 | 3/2021 | Brandt et al. |
| 2021/0237284 | A1 | 8/2021 | Vraa et al. |
| 2021/0260757 | A1 | 8/2021 | Nielsen et al. |
| 2021/0260759 | A1 | 8/2021 | Knudsen et al. |

FOREIGN PATENT DOCUMENTS

| | | |
|---|---|---|
| CN | 102681465 A | 9/2012 |
| CN | 103250109 | 8/2013 |
| CN | 103250109 A | 8/2013 |
| CN | 103386685 A | 11/2013 |
| CN | 103600350 A | 2/2014 |
| CN | 104049573 A | 9/2014 |
| DE | 2735632 C2 | 2/1978 |
| DE | 19858154 A1 | 6/2000 |
| DE | 10048096 A1 | 4/2002 |
| DE | 10157174 A1 | 6/2003 |
| DE | 10239694 A1 | 3/2004 |
| DE | 102006061752 A1 | 7/2008 |
| DE | 102008027008 A1 | 12/2009 |

(56) References Cited

FOREIGN PATENT DOCUMENTS

| | | |
|---|---|---|
| EP | 1505464 A2 | 2/2005 |
| EP | 1696289 A1 | 8/2006 |
| EP | 1724676 A1 | 11/2006 |
| EP | 1842631 A1 | 10/2007 |
| EP | 1842631 A1 | 10/2007 |
| EP | 1947541 A1 | 7/2008 |
| EP | 2258521 A1 | 12/2010 |
| EP | 2345515 A1 | 7/2011 |
| EP | 2453325 A1 | 5/2012 |
| EP | 2641136 A1 | 9/2013 |
| EP | 3015932 A1 | 5/2016 |
| ES | 2548037 T3 | 10/2015 |
| JP | H01-146645 A | 6/1989 |
| JP | H02-250782 A | 10/1990 |
| JP | H06-190753 A | 7/1994 |
| JP | H10-254527 A | 9/1998 |
| JP | 2001-050741 A | 2/2001 |
| JP | 2001353678 A | 12/2001 |
| JP | 2002-120174 A | 4/2002 |
| JP | 2004-49731 A | 2/2004 |
| JP | 2004-148466 A | 5/2004 |
| JP | 2004-316722 A | 11/2004 |
| JP | 2005-148789 A | 6/2005 |
| JP | 2005-342885 A | 12/2005 |
| MX | 2013005425 A | 8/2013 |
| RU | 203125348 A | 12/2014 |
| WO | 9700454 A1 | 1/1997 |
| WO | 2004071717 A1 | 8/2004 |
| WO | WO-2006/043873 A1 | 4/2006 |
| WO | 2007099511 A2 | 9/2007 |
| WO | WO-2008/119383 A1 | 10/2008 |
| WO | 2009107358 A1 | 9/2009 |
| WO | 2010071384 A3 | 6/2010 |
| WO | WO-2010/071384 A2 | 6/2010 |
| WO | 2012066025 A1 | 5/2012 |
| WO | WO-2010/071384 A3 | 2/2013 |

OTHER PUBLICATIONS

Office Action for Mexican Patent Application No. MX/a/2018/000008. dated Feb. 16, 2021, with English Summary (5 Pages.).
Office Action for Japanese Patent Application No. 2017-567750, 8 pages (dated Aug. 25, 2020), with Foreign Associate Summary in English.
First Office Action for Chinese Patent Application No. 201680040209.8, 9 pages (dated Jul. 2, 2020) (concise statement of relevance for this Office Action is provided in the transmittal submitted herewith).
First Office Action for Chinese Patent Application No. 201680040209.8, 9 pages (dated Jul. 2, 2020).
First Examination Report for 1608/KOLNP/2013, 6 pages (dated Mar. 26, 2019).
Bennett, D. and Hollerbach, J., Autonomous Calibration of Single-Loop Closed Kinematic Chains Formed by Manipulators with Passive Endpoint Constraints, IEEE Transactions of Robotics and Automation, 7(5):597-606 (1991).
Espacenet Patent Search; Family List EP2641136 downloaded Jun. 5, 2017 (2 pages).
File History for CN201180054670 downloaded Jun. 5, 2017 (70 pages).
File History for EP2453325 downloaded Jun. 5, 2017 (48 pages).
File History for EP2641136 downloaded Jun. 5, 2017 (1116 pages) (counterpart to U.S. Appl. No. 13/885,233).
File History for EP3015932 downloaded Jun. 5, 2017 (93 pages ).
Flange.pdf (Merriam-Webster, Flange I Definition of flange by Merriam-Webster, Jun. 23, 2015, http://www.merriamwebster.com/dictionary/flange,pp. 1-4).
Robot.pdf (Dictionary.com, Robot I Define Robot at Dictionary.com, Jun. 23, 2015, http://dictionary.reference.com/browse/robot?s=t, pp. 1-5).
Summons in counterpart European case to attend oral proceedings pursuant to Rule 115(1) EPC for EP11784999.2-1802 / 2641136, 8 pages (Dec. 1, 2016).
Communication pursuant to Article 94(3) EPC for EP15176362.0-1802, 4 pages (dated Jan. 5, 2017).
Maier, C., Aufbau and Einsatz von Industrierobotern, Design and Use of Industrial Robots, Lecture Notes, 3rd Edition, Institute for Production Technology, 11 pages (1996). [English translation unavailable].
Opposition against EP 2641136 B1, 27 pages (dated Jul. 22, 2015).
User Manual KR C2 / KR C3 Expert Programming, KUKA System Software (KSS) Release 5.2, Version 00: 183 pages (2003).
International Search Report for PCT/EP2011/070228 dated Feb. 9, 2012.
Written Opinion of the International Searching Authority for PCT/EP2011/070228 dated Feb. 9, 2012.
International Preliminary Report on Patentability for PCT/EP2011/070228 dated Feb. 27, 2013.
Extended Search Report for EP16820882.5, 8 pages (dated Feb. 4, 2019).
International Search Report for PCT/DK2016/050240 (Method for Extending End User Programming of an Industrial Robot With Third Party Contributions, filed Jul. 7, 2016), issued by ISA/DK, 7 pages (dated Dec. 1, 2017).
Written Opinion for PCT/DK2016/050240 (Method for Extending End User Programming of an Industrial Robot With Third Party Contributions, filed Jul. 7, 2016), issued by ISA/DK, 10 pages (dated Dec. 1, 2017).
Communication pursuant to Article 94(3) EPC for European Patent Application No. 16820882.5, dated Jul. 27, 2021, (5 Pages).
Third Office Action for Chinese Patent Application No. 201680040209.8. dated Jul. 22, 2021, with English Summary (7 Pages.).
Examiner Requisition for Canadian Patent Application No. 2,991,244, dated Oct. 27, 2022, (4 Pages.).
Notification of Grounds for Refusal for Korean Patent Application No. 10-2018-7003466, dated Dec. 9, 2022, with English Translation, (10 Pages).
Communication pursuant to Article94(3) EPC in Application No. 16820882.5 dated Aug. 10, 2023, 6 pages.

* cited by examiner

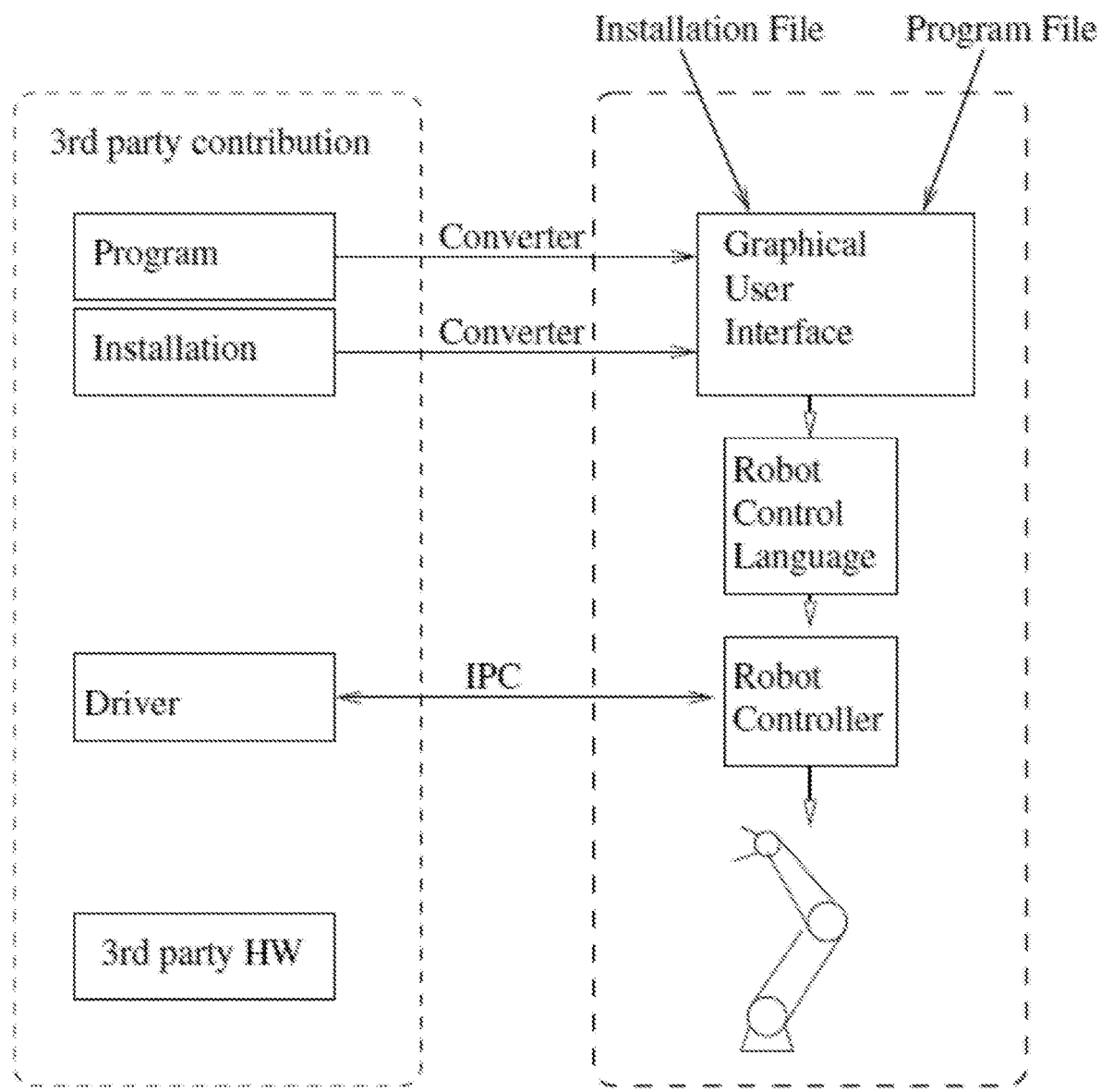

METHOD FOR EXTENDING END USER PROGRAMMING OF AN INDUSTRIAL ROBOT WITH THIRD PARTY CONTRIBUTIONS

CROSS-REFERENCE TO RELATED APPLICATIONS

This application is a continuation of U.S. patent application Ser. No. 15/738,315 which was filed on Dec. 20, 2017, U.S. patent application Ser. No. 15/738,315 being a U.S. national stage entry of International Application No. PCT/DK2016/050240 which was filed on Jul. 7, 2016, International Application No. PCT/DK2016/050240 claiming priority to DK Application No. PA201570451 which was filed on Jul. 8, 2015. U.S. patent application Ser. No. 15/738,315, International Application No. PCT/DK2016/050240, and DK Application No. PA201570451 are incorporated by reference into this application.

FIELD OF THE INVENTION

The present invention relates to a method for programming an industrial robot. More specifically, the invention relates to a method for programming an industrial robot, where distributors and integrators can present accessories that run successfully at end users. Also the developer can define customized installation screens and program nodes for the end user. The invention provides a software platform, where the developer can define customized installation screens and program nodes for the end user.

BACKGROUND OF THE INVENTION

Before an industrial robot is to be put in operation for a certain task, it must be programmed to carry out the task. Various robot programming languages are available originating from different robot suppliers. A robot program comprises a series of robot instructions written in a robot programming language.

Customers who buy industrial robots generally want to be able to control or manipulate a robot, and to program the robot, relative to various objects and boundaries in the surroundings of the robot, such as machines, objects or blanks, fixtures, conveyers, pallets or vision systems.

The end-user would sometimes face a challenge when installing and programming third party hardware (tools, such as grippers) as well as accompanying third party software to be integrated in the industrial robot system.

Industrial robots are highly flexible devices used for a wide variety of operations in many different industrial applications. Industrial robots are conventionally programmed via a robot programming language that is very similar to conventional computer programming languages. A robot program includes a sequence of program instructions, where each instruction tells the robot control unit what to do and how to do it. Robots are programmed to follow a path including a plurality of target points. The robot program includes the positions of the target points. The programming of robots is a time consuming process and the conventional methods of using the robot during the programming and teaching process ties up the production equipment and delays production start.

There is a need for a method to extend an existing robot system with customized functionalities by still using the software platform available in the robot system. Hereby a robot developer can define customized installation screens and program nodes for the end user. These can, for example, encapsulate complex new robot programming concepts, or provide friendly hardware configuration interfaces.

SUMMARY OF THE INVENTION

The above and other objects and advantages are obtained by the provision of a programmable robot having the unique feature that it can be programmed with third party plug-ins provided with the third party tools.

Thus, according to a first aspect of the present invention there is provided a method of programming an industrial robot with third party hardware and software, wherein the method includes:
  providing an industrial robot having a user graphical interface (GUI) for programming the robot and installing third party software, said GUI including i) an installation tab, wherein the installation of the robot is specified, said installation tab configured to allow setting up of parameters for the third party hardware mounted on the robot, and ii) a program tab, wherein the program of the robot is specified, said program tab configured to allow setting up of the steps to be performed by the hardware;
  installing the third-party software, based on a dedicated file format, that adds a GUI element to the installation tab and the program tab;
  installing third-party hardware, such as a tool, based on said software components containing GUI elements.

The method may further comprise one or more of the following steps:
  storing in a memory location a set of predefined positions comprising preprogrammed robot code to define one or more geometrical features relative to objects in the surroundings of the robot and establishing a relationship between said geometrical features and first coordinates of a robot-related coordinate system;
  integrating the GUI on a graphical display device, displaying information about the predefined positions and allowing a user to select one or more of the predefined positions and to specify the order in which the robot shall visit the selected positions,
  receiving information about which of the predefined positions the user has selected and the order in which the robot shall visit the selected workstations, and generating a robot program for performing a work cycle based on said predefined positions and said received and stored information about the selected positions and the order in which the robot shall visit the selected positions.

According to a further aspect of the invention, the object is achieved by a computer program directly loadable into the internal memory of a computer or a processor, comprising software code portions for performing the steps of the method according to the invention, when said program is run on a computer. The computer program is provided either on a computer readable medium or through a network.

According to another aspect of the invention, the object is achieved by a computer readable medium having a program recorded thereon, when the program is to make a computer perform the steps of the method according to the invention, and said program is run on the computer.

According to the invention, a set of predefined workstations, comprising preprogrammed robot code, are stored in a memory location. The user creates a robot program by selecting one or more workstations from the predefined set of workstations and specifying the order in which the robot shall visit the selected workstations. This allows the operator to create a graphical representation that reflects the configuration of the real robot cell.

A workstation is a physical location on which the robot may carry out work. Each predefined workstation represents a real workstation and a defined task to be carried out by the robot at the workstation. The preprogrammed robot code is specially designed for controlling the robot so that it carries out the defined task at the workstation. Examples of workstations are: an injection mold machine, a dye casting machine, a scrap station for throwing away rejected objects, a device for vision control of the object, one or more stations for subsequent treatment of the object, and an output station such as a conveyer. Examples of tasks are: pick a molded object from the mold, throw the object in the waste basket, hold the object during a vision control, move the object in a predefined way in relation to a treatment tool, put the object in an assembly with other objects, place the object on the conveyer. The subsequent treatment is for instance flaming, deburring, degating, dispensing, polishing, grinding or painting.

The user interacts with one or more graphical interfaces during the creation of the robot program. In this context a graphical interface is defined as a view or a part of a view, adapted for interaction with a user and displayed on the display device. The graphical interface is adapted for displaying information, in the form of text and symbols, and choices to the user, and to receive commands, data and selections entered by the user.

A robot program is generated based on the stored, predefined workstations including predefined robot program code, and information entered by the user via the user interfaces about selected workstations and the order in which the robot shall visit the selected workstations. The programming code is hidden from the user, and the user creates a robot program by interacting with one or more graphical interfaces. Thus, the invention makes it possible for a user to create a robot program without using any programming code. The invention offers an easy and pedagogical way to program a robot, and does not require any knowledge about robot languages. Based on the software platform provided with the present invention it is easy for the user to reprogram the robot in connection with adding and removing a third party workstation to the robot cell. A further advantage gained with the present invention is that the user will find it just as easy to program an advanced robot with five or six axes, as to program a simple linear robot with only three axes. The term industrial robot refers to linearly movable manipulators as well as robots including rotational movement axes. The invention is useful for programming industrial manipulators or robots for any application including visiting and performing work on one or more workstations.

BRIEF DESCRIPTION OF THE DRAWING

FIG. 1 shows a diagram of the relationship between the software and hardware components supplied with the robot system and the third-party supplied additions to this system.

DETAILED DESCRIPTION OF THE INVENTION

The invention will now be explained more closely by the description of the principles shown in FIG. 1. Specifically the FIGURE shows how the programming of an industrial robot with third party hardware and software is carried out.

An industrial robot having a user graphical interface (GUI) for programming the robot is provided. The installation of the third party software is performed where the GUI includes an installation tab, wherein the installation of the robot is specified, said installation tab configured to allow setting up of parameters for the third party hardware mounted on the robot, and a program tab, wherein the program of the robot is specified, said program tab configured to allow setting up of the steps to be performed by the hardware. Then the third-party software is installed, based on a dedicated file format that adds a GUI element to the installation tab and the program tab. Finally the third-party hardware (or own hardware) is installed based on said software components containing GUI elements.

The invention concerns a platform where distributors and integrators can present accessories that run successfully at end users. This gives rise to shorter lead time to implement robot applications, and lower project risks, higher predictability of project costs and time, access to well-proven technology, and share information. The concept includes both hardware and software solutions, whereas the present invention is concerned with the software aspects of this concept.

By implementation of the present invention an industrial robot becomes receptive to the installation of third-party software components, based on a dedicated file format. These files can amongst other things contain graphical user interface elements that will become part of our user interface. A typical use case could be the installation of a gripper on the robot. The gripper would come with a dedicated file, which would add a general user interface element to the installation tab (where the installation of the robot is specified) and to the program tab (where the program of the robot is specified). In the installation tab, it would allow the set-up of parameters for how the gripper is mounted on the robot and what electrical signals are used for the gripper. In the program tab, it would allow to specify whether the gripper should open or close, and possible also the gripping force, closing speed etc.

Generally, an industrial robot comprises a manipulator, a control unit for controlling the manipulator, and a portable operator control device, denoted a teach pendant unit, for teaching and manually operating the manipulator.

In accordance with the present invention end-users have the possibility to install various plugin packages. A single package may contain a contribution to the installation tab and/or program nodes. After installation of the software the new screens will automatically become available for the control device. Furthermore, the screens look and act as if they were part of the default control environment.

Installation tab contributions store their settings in the, so called, installation. This file contains the configuration for a particular work-cell. The configuration among others contains the verified safety settings. End-users programming robots, using the present invention, automatically link the program under design to the specific installation. Consequently, when the program is loaded, the assigned installation (including verified safety configuration and settings) is loaded as well. This simplifies the workflow for end-users, because the number of significant configuration files remains the same (i.e. one).

Program node contributions store their parameters in the, so called, program files. These files contain the program for the automation task the robot is supposed solve. The combination of default control program parameters and specific parameters gives the same workflow advantages to the end-user (similar to the installation file), since the number of significant files remains one.

The separation of concerns, between configuration of the robot work-cell and program design, promoted by the control device lowers the design complexity for end-users. Both concerns focus on complementary aspects of the automation task and give the end-user a systematic way of solving the automation problem. The control device ensures that both concerns are integrated in an appropriate manner. With the framework of the present invention the same separation of concerns and integration can be provided to end-users, i.e. installation tab contributions can share settings with program node contributions.

For instance, if an electro-mechanical gripper is supposed to be installed and used for an automation task the following steps could be taken. As the gripper supplier chose to guide the end-user through the installation process, he directs the end-user to install the plug-in first and to navigate to the Installation tab. In the Installation tab the contribution then shows the end-user visually how the gripper's power supply and communication interface should be connected. After the communication interface and power have been connected physically, the gripper boots up and starts communicating with the gripper software. At this point, the gripper software detects the physical gripper and the screen changes from showing the visual installation guide to a configuration interface. In the configuration interface, for instance, the maximum closing force can be configured. After the configuration has been done, the end-user can start making a program. The end-user navigates to the program tab and starts programming his task. At the point where he wants to fetch an object he looks for an appropriate program node and finds the "Gripper" node. He inserts the gripper node in the same manner as any other program node. The command tab (for program node parametrization) shows the available parameters that can be tuned in a visually appealing manner. After the end-user specified the gripper opening distance and closing distance, the gripper node is parameterized. To test the gripper parameters, the command tab offers a "Joggle" button which will open and close the gripper, without running the entire program. Before any program can be run, each program node will need to generate a code that executes the specified actions. Information stored in the installation, e.g. the maximum closing force, can be employed here as well. For the gripper node, the developer has taken care of the script generation (using the framework of the present invention). On pressing the play button in the control device, the program will be converted into the script of the robot and the robot will start performing the programmed task.

The framework of the present invention enables:
Easy setup of third party hardware, which is usually a complex task not suited for regular end-users (like factory workers). The benefits are: lower technical expertise required, less time for setup and allows easy repetition for setup of $3^{rd}$ party hardware→lower setup costs.
Seamless integration with the normal workflow.
Both the framework and control device promote the same workflow.

The invention claimed is:

1. An industrial robot comprising:
a graphical user interface (GUI) for programming the industrial robot, the GUI comprising:
an installation tab initially configured to specify parameters for the industrial robot; and
a program tab initially configured to specify operations to be performed by the industrial robot;
memory storing an extensible operating system configured to install third-party software on a processing device associated with the industrial robot, the third-party software being based on a dedicated file format; and
the processing device programmed with the third-party software, the third-party software being configured to reconfigure the installation tab to add a GUI element to the installation tab to specify parameters for third-party hardware and to reconfigure the program tab to add a GUI element to the program tab to specify operations to be performed by the third-party hardware, wherein the GUI element of the program tab comprises a selectable program node that is addable to the program for specifying parameters of the operations to be performed by the third-party hardware.

2. The industrial robot of claim 1, wherein the program tab is configured to specify operations in a robot program to be executed by the processing device associated with the industrial robot;
the memory stores robot code comprising the robot program for causing the industrial robot to perform a task on at least one of a plurality of workstations; and
where the program tab comprises at least one GUI element for specifying the operations in the robot program by:
receiving selection of at least one of the plurality of workstations; and
receiving an order in which the industrial robot is to visit the at least one of the plurality of workstations.

3. The industrial robot of claim 2, wherein the robot code is based on the at least one of the plurality of workstations and predefined robot program code.

4. The industrial robot of claim 2, wherein the at least one of the plurality workstations represents at least one physical workstation; and
wherein the robot code defines the task to be performed by the industrial robot at the at least one physical workstation.

5. The industrial robot of claim 4, wherein the at least one physical workstation comprises at least one of the following: an injection mold machine, a dye casting machine, a scrap station for discarding rejected objects, a device for controlling vision of an object, one or more stations for treating an object, or an output station comprising a conveyer.

6. The industrial robot of claim 4, wherein the task comprises at least one of the following: picking a molded object from a mold, throwing an object in a waste basket, holding an object during vision control, moving an object in a predefined way in relation to a treatment tool, putting an object in an assembly with other objects, or placing an object on a conveyer.

7. The industrial robot of claim 2, wherein the robot program is configured to control the industrial robot so that the industrial robot performs the task.

8. The industrial robot of claim 7, wherein the task comprises at least one of the following: picking a molded object from a mold, throwing an object in a waste basket, holding an object during vision control, moving an object in a predefined way in relation to a treatment tool, putting an object in an assembly with other objects, or placing an object on a conveyer.

9. The industrial robot of claim 2, wherein the robot code is hidden from a user; and wherein the selection and the order are received in response to the user interacting with the at least one GUI element.

10. The industrial robot of claim 9, wherein the GUI is configured to display information as text and symbols, to provide choices to the user, and to receive commands, data, and selections entered by the user.

11. The industrial robot of claim 2, wherein the industrial robot is configured to receive, and to store in the memory, at least one of program code or workstation code.

12. The industrial robot of claim 2, wherein the robot code comprises position code that specifies predefined positions of the industrial robot by (i) defining relationships between one or more geometrical features and objects in surroundings of the industrial robot and (ii) by establishing relationships between the one or more geometrical features and first coordinates of a robot-related coordinate system; and
where the program tab comprises at least one GUI element for specifying the operations in the robot program by:
receiving selection of at least one of the predefined positions and at least one of the plurality of workstations; and
receiving an order in which the industrial robot is to assume the at least one of the predefined positions.

13. The industrial robot of claim 1, wherein the GUI element added to the installation tab is for holding information about connecting the third-party hardware to the industrial robot.

14. The industrial robot of claim 1, wherein the GUI element added to the program tab is for specifying operations to be performed by the third-party hardware connected to the industrial robot.

15. The industrial robot of claim 1, wherein the GUI element added to the program tab is for enabling configuration of the third-party hardware connected to the industrial robot.

16. The industrial robot of claim 1, wherein the extensible operating system supports one or more of third-party daemons, servers, or other programs to be installed on the industrial robot to extend functionality of the industrial robot through added GUI elements.

17. The industrial robot of claim 1, further comprising:
the third-party hardware comprising an interface to industrial equipment;
wherein the GUI comprises a GUI element in the installation tab to hold information about connecting the industrial robot to the industrial equipment; and
wherein the GUI comprises a GUI element in the program tab to trigger events or functions of the industrial equipment.

18. The industrial robot of claim 1, further comprising:
the third-party hardware comprising an electro-mechanical gripper;
wherein the GUI element added to the program tab is to enable configuration of one or more physical parameters of the electro-mechanical gripper; and
wherein the GUI element added to the program tab is to enable programming tasks to be performed by the electro-mechanical gripper and the industrial robot.

19. The industrial robot of claim 18, wherein the GUI comprises a GUI element in the installation tab to present, visually, how a power supply interface and a communication interface for the electro-mechanical gripper should be connected to the industrial robot.

20. The industrial robot of claim 1, further comprising:
the third-party hardware comprising a vision system;
wherein the GUI element added to the installation tab is to present visually how the vision system should be connected to the industrial robot, how camera coordinates of a camera in the vision system relate to robot-related coordinates, and what part to identify using the vision system.

21. The industrial robot of claim 20, wherein the GUI comprises a GUI element in the program tab to enable programming the industrial robot to move the part identified by the vision system; and
where the memory stores a program configured to perform, automatically, mathematical transformation from vision system coordinates to robot-related coordinates.

22. The industrial robot of claim 1, wherein the program tab is configured to specify operations in a robot program to be executed by the processing device associated with the industrial robot;
wherein the memory stores robot code comprising position code that specifies predefined positions of the industrial robot by (i) defining relationships between one or more geometrical features and objects in surroundings of the industrial robot and (ii) by establishing relationships between the one or more geometrical features and first coordinates of a robot-related coordinate system; and
where the program tab comprises at least one GUI element for specifying the operations in the robot program by:
receiving selection of at least one of the predefined positions; and
receiving an order in which the industrial robot is to assume the at least one of the predefined positions.

23. The industrial robot of claim 22, wherein the robot program is based on the at least one of the predefined positions and predefined robot program code.

24. The industrial robot of claim 22, wherein robot code is hidden from a user; and
wherein the selection and the order are received in response to the user interacting with the at least one GUI element.

25. The industrial robot of claim 24, wherein the GUI is configured to display information as text and symbols, to provide choices to the user, and to receive commands, data, and selections entered by the user.

26. The industrial robot of claim 22, wherein the industrial robot is configured to receive, and to store in the memory, at least one of the predefined positions or the program code.

27. A method for programming an industrial robot, the industrial robot comprising:
a graphical user interface (GUI) for programming the industrial robot, the GUI comprising:
an installation tab initially configured to specify parameters for the industrial robot; and
a program tab initially configured to specify operations to be performed by the industrial robot; and
memory storing an extensible operating system configured to install third-party software for the industrial robot;
wherein the method comprises:
installing the third-party software on the memory, the third party software adding a GUI element to the installation tab to specify parameters for third-party hardware, and adding a GUI element to the program tab in a form of a program node to specify operations to be performed by the third-party hardware; and adding the program node to a program of the industrial robot by specifying parameters of operations to be performed by the third-party hardware utilizing the program node.

28. The method of claim 27, further comprising:
configuring the third-party hardware by utilizing GUI element added to the installation tab.

\* \* \* \* \*